(12) United States Patent
Shi et al.

(10) Patent No.: US 11,805,538 B2
(45) Date of Patent: Oct. 31, 2023

(54) METHOD AND DEVICE FOR RESOURCE INDICATION, AND STORAGE MEDIUM

(71) Applicant: ZTE Corporation, Guangdong (CN)

(72) Inventors: Jing Shi, Guangdong (CN); Shuqiang Xia, Guangdong (CN); Wen Zhang, Guangdong (CN); Xianghui Han, Guangdong (CN); Min Ren, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/088,477

(22) Filed: Dec. 23, 2022

(65) Prior Publication Data
US 2023/0209581 A1 Jun. 29, 2023

Related U.S. Application Data

(63) Continuation of application No. 16/816,045, filed on Mar. 11, 2020, now Pat. No. 11,540,288, which is a (Continued)

(30) Foreign Application Priority Data

Sep. 11, 2017 (CN) .......................... 201710814241.3

(51) Int. Cl.
*H04W 72/04* (2023.01)
*H04W 72/53* (2023.01)
(Continued)

(52) U.S. Cl.
CPC ....... *H04W 72/53* (2023.01); *H04W 72/0446* (2013.01); *H04W 72/0453* (2013.01);
(Continued)

(58) Field of Classification Search
CPC . H04W 72/53; H04W 72/23; H04W 72/0446; H04W 72/0453; H04W 80/08
See application file for complete search history.

(56) References Cited

U.S. PATENT DOCUMENTS 10,098,120 B2 10/2018 Alvarino et al.
10,153,890 B2 12/2018 Chae et al.
(Continued)

FOREIGN PATENT DOCUMENTS

CN 106488565 A 3/2017
CN 106961741 A 7/2017
(Continued)

OTHER PUBLICATIONS

International Search Report and Written Opinion in International Application No. PCT/CN2018/105047, dated Dec. 3, 2018, 6 pages.
(Continued)

*Primary Examiner* — Samina F Choudhry
(74) *Attorney, Agent, or Firm* — Perkins Coie LLP

(57) ABSTRACT

Provided is a method for indicating a resource, including: indicating, in a configured time-frequency resource region, a time-frequency resource of a service with first transmission duration pre-empted by a service with second transmission duration, by physical layer signaling, where the first transmission duration is larger than the second transmission duration. An apparatus for indicating a resource and a storage medium are further disclosed herein.

20 Claims, 2 Drawing Sheets

Indicating, in a configured time-frequency resource region, a time-frequency resource of a service of first transmission duration pre-empted by a service of second transmission duration through physical layer signaling — 102

Related U.S. Application Data continuation of application No. PCT/CN2018/105047, filed on Sep. 11, 2018.

(51) Int. Cl.
- *H04W 72/0446* (2023.01)
- *H04W 72/0453* (2023.01)
- *H04W 80/08* (2009.01)
- *H04W 72/23* (2023.01)
- *H04L 5/00* (2006.01)

(52) U.S. Cl.
CPC ........... *H04W 72/23* (2023.01); *H04W 80/08* (2013.01); *H04L 5/0007* (2013.01)

(56) References Cited

U.S. PATENT DOCUMENTS

| | | | |
|---|---|---|---|
| 10,728,002 | B2 | 7/2020 | Islam et al. |
| 2013/0262147 | A1 | 10/2013 | Saus et al. |
| 2017/0295000 | A1* | 10/2017 | Yoo ........................ H04L 5/0026 |
| 2018/0027576 | A1 | 1/2018 | Kowalski et al. |
| 2018/0063865 | A1 | 3/2018 | Islam et al. |
| 2018/0278454 | A1* | 9/2018 | Islam .................... H04L 1/0038 |
| 2020/0351887 | A1 | 11/2020 | Miao et al. |
| 2022/0140977 | A1 | 5/2022 | Xiong et al. |

FOREIGN PATENT DOCUMENTS

| | | |
|---|---|---|
| JP | 2017-525222 A | 8/2017 |
| JP | 2019-508936 A | 3/2019 |
| JP | 2020-528253 A | 9/2020 |
| JP | 2020-530960 A | 10/2020 |
| WO | 2012134364 A1 | 10/2012 |

OTHER PUBLICATIONS

ZTE et al. "On Pre-Emption Indication" 3GPP TSG RAN WG1 Meeting 90bis R1-1717043, Oct. 13, 2017 (Oct. 13, 2017), 10 pages.

ZTE et al. "About DL Pre-Emption Indication" 3GPP TSG RAN1-NR#3 R1-1715561, Sep. 21, 2017 (Sep. 21, 2017), 9 pages.

ZTE. "About Pre-Emption Indication" 3GPP TSG RAN WG1 NR Meeting #90 R1-1712668, Aug. 25, 2017 (Aug. 25, 2017), 6 pages.

Supplementary European Search Report in European Application No. 18853092.7, dated May 25, 2021, 12 pages.

Huawei et al: "On DL multiplexing of URLLC and eMBB transmissions", 3GPP Draft; R1-1704216, 3rd Generation Partnership Project (3GPP), Mobile Competence Centre, 650, Route Des Lucioles, F-06921 Sophia-Antipolis Cedex, France • vol. RAN WG1, No. Spokane, USA; Apr. 3, 2017-Apr. 7, 2017 Mar. 25, 2017 (Mar. 25, 2017), XP051251025, Retrieved from the Internet: URL:http://www.3gpp.org/ftp/tsgran/WGI RL 1/TSGRI 88b/Docs/ - - [retrieved on Mar. 5, 2017], 8 pages.

Huawei et al: "On pre-emption indication for DL multiplexing of URLLC and eMBB", 3GPP Draft; R1-1708124, 3rd Generation Partnership Project (3GPP), Mobile Competence Centre, 650, Route Des Lucioles, F-06921 Sophia-Antipolis Cedex, France • vol. RAN WG1, No. Hangzhou, China; May 15, 2017-May 19, 2017 May 14, 2017 (May 14, 2017), XP051273320, Retrieved from the Internet: URL:http://www.3gpp.org/ftp/ Meetings 3GPP SYNC/RANI/Docs/ - - [retrieved on May 14, 2017], 9 pages.

Huawei et al. "On Pre-Emption Indication for DL multiplexing of URLLC and eMBB" 3GPP TSG RAN WG1 Meeting #90 R1-1712204, Aug. 21-25, 2017, 8 pages.

U.S. Appl. No. 62/543,647, filed Aug. 10, 2017, 45 pages.

Sequans Communications, "Considerations on preemption indication for DL," 3GPP TSG RAN WG1 Meeting #90, R1-1714085, Prague, P.R. Czechia, Aug. 21-25, 2017, 5 pages.

Huawei et al., "Discussion on configuration and design of group common pre emption Indication," 3GPP TSG RAN WG1 Meeting #90, R1-1713754, Prague, Czech Republic, Aug. 21-25, 2017, 8 pages.

Catr, "Discussion on the design of DL preemption indication," 3GPP TSG RAN WG1 Meeting #90, R1-1714228, Prague, Czechia, Aug. 21-25, 2017, 2 pages.

Catt, "Further design considerations for DL pre-emption indication," 3GPP TSG RAN WG1 Meeting #90, R1-1712422, Prague, Czechia, Aug. 21-25, 2017, 4 pages.

KT Corp., "Remaining on preemption indication for DL," 3GPP TSG RAN WG1 Meeting NR#3, R1-1716573, Nagoya, Japan, Sep. 18-21, 2017, 3 pages.

European Communication under Rule 71(3) EPC issued in EP Patent Application No. 18853092.7, dated Mar. 30, 2023, 9 pages.

Australian examination report issued in AU Patent Application No. 2018328588, dated Jul. 29, 2022, 4 pages.

Australian notice of acceptance issued in AU Patent Application No. 2018328588, dated Dec. 21, 2022, 3 pages.

Chinese office action issued in CN Patent Application No. 201710814241.3, dated Mar. 3, 2021, 13 pages. English translation included.

Chinese office action issued in CN Patent Application No. 201710814241.3, dated Sep. 16, 2021, 12 pages. English translation included.

Chinese Notification to Complete Formalities of Registration issued in CN Patent Application No. 201710814241.3, dated Mar. 2, 2022, 6 pages. English translation included.

Japanese office action issued in JP Patent Application No. 2020-535288, dated Mar. 8, 2022, 4 pages. English translation included.

Japanese Decision of Patent issued in JP Patent Application No. 2020-535288, dated Jun. 21, 2022, 5 pages. English translation included.

Mexican office action issued in MX Patent Application No. MX/a/2020/002751, dated Aug. 23, 2023, 6 pages. English translation included.

Korean office action issued in KR Patent Application No. 10-2020-7010361, dated Aug. 16, 2023, 7 pages. English translation included.

NTT Docomo, Inc., "Pre-emption indication for downlunk," 3GPP TSG RAN WG1 Meeting #90, R1-1713960, Prague, Czechia, Aug. 21-25, 2017, 3 pages.

Huawei et al., "On-pre-emption indication for DL multiplexing of URLLC and eMBB," 3GPP TSG RAN WG1 ad Hoc Meeting, R1-1715409, Nagoya, Japan, Sep. 18-21, 2017, 15 pages.

* cited by examiner

METHOD AND DEVICE FOR RESOURCE INDICATION, AND STORAGE MEDIUM

CROSS REFERENCE TO RELATED APPLICATIONS

This application is a continuation of U.S. patent application Ser. No. 16/816,045, filed on Mar. 11, 2020, which is a continuation of and claims priority to International Patent Application No. PCT/CN2018/105047, filed on Sep. 11, 2018, which claims the benefit of priority of Chinese Application No. 201710814241.3, filed in the Chinese Patent Office on Sep. 11, 2017. The entire contents of the before-mentioned patent applications are incorporated by reference as part of the disclosure of this application.

TECHNICAL FIELD

The present disclosure relates to the field of communications, such as relating to a method and apparatus for indicating a resource, and a storage medium.

BACKGROUND

Currently, Long-Term Evolution (LTE), Long-Term Evolution Advance (LTE-A) of the 4th generation mobile communication technology (4G) and the 5th generation mobile communication technology (5G) are facing increasing demand. In view of the current development trend, in both 4G and 5G systems, features of supporting enhanced mobile broadband, ultra-reliable low-latency transmission, and massive connectivity are being studied.

In order to support features of ultra-reliable low-latency transmission, low-latency and ultra-reliable services need to be transmitted in a short transmission time; and at the same time services that is transmitted by part of resources processes in a short transmission time may be pre-empted, during a transmission process of other services with a long transmission time.

In the related art, with respect to the problem about how to indicate a resource of a service receiving side with long transmission duration pre-empted by a service with short transmission duration when a communication system transmits services with different transmission duration, no effective solution has been proposed.

SUMMARY

An embodiment of the present disclosure provides a method and apparatus for indicating a resource, and a storage medium, in order to at least solve the problem in the related art about how to indicate a resource of a service receiving side with long transmission duration pre-empted by a service with short transmission duration when a communication system transmits services with different transmission duration.

According to an embodiment of the present disclosure, a method for indicating a resource is provided, the method includes: indicating, in a configured time-frequency resource region, a time-frequency resource of a service with first transmission duration pre-empted by a service with second transmission duration by physical layer signaling, where the first transmission duration is larger than the second transmission duration.

According to another embodiment of the present disclosure, an apparatus for indicating a resource is further provided, and the apparatus includes: an indication module, which is configured to indicate, in a configured time-frequency resource region, a time-frequency resource of a service with first transmission duration pre-empted by a service with second transmission duration by physical layer signaling, where the first transmission duration is larger than the second transmission duration.

According to another embodiment of the present disclosure, a storage medium is provided, and the storage medium includes a storage program, where the program when executed performs the above method for indicating a resource.

DETAILED DESCRIPTION

Terms "first" or "second" and the like in the specification and claims of the present disclosure and the above accompany drawings are used for distinguishing similar objects, but are not necessarily used for describing a particular order or a precedence order.

Embodiment 1

Figure 1:
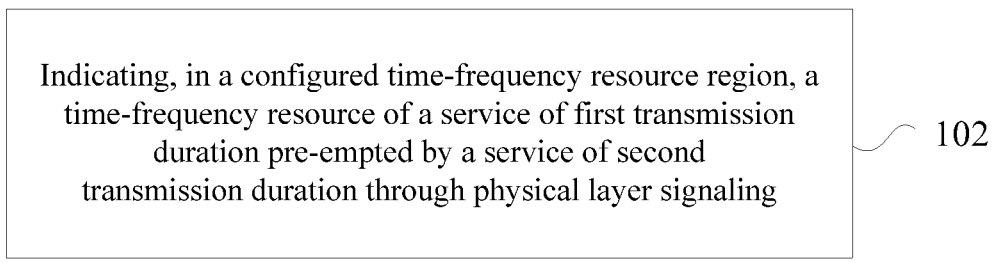
FIG. 1 is a flowchart of a method for indicating a resource according to an embodiment of the present disclosure.

In the present embodiment, a method for indicating a resource is provided. FIG. 1 is a flowchart of the method for indicating a resource, according to an embodiment of the present disclosure. As shown in FIG. 1, the flow includes a step 102.

In step 102, indicating, in a configured time-frequency resource region, a time-frequency resource of a service with first transmission duration pre-empted by a service with second transmission duration by physical layer signaling, where the first transmission duration is larger than the second transmission duration.

In an embodiment, a determining manner for a time domain granularity and a frequency domain granularity corresponding to the time-frequency resource of the service with the first transmission duration pre-empted by the service with the second transmission duration includes one of the following:

both the time domain granularity and the frequency domain granularity are indicated by the physical layer signaling or configured by high-layer signaling;

the time domain granularity is determined by indication of the physical layer signaling or configuration of the high-layer signaling, and the frequency domain granularity is determined according to the determined time domain granularity; or the frequency domain granularity is determined by indication of the physical layer signaling or configuration of the high-layer signaling, and the time domain granularity is determined according to the determined frequency domain granularity.

Through the present disclosure, since the time-frequency resource of the service with the first transmission duration pre-empted by the service with the second transmission duration can be indicated by the physical layer signaling in the configured time-frequency resource region, where the first transmission duration is larger than the second transmission duration, and where the determining manner for the time domain granularity and the frequency domain granularity of the time-frequency resource are pre-empted by the service with the second transmission duration includes one of the following: both the time domain granularity and the frequency domain granularity are indicated by the physical layer signaling or configured by the high-layer signaling; the time domain granularity is determined by indication of the physical layer signaling or configuration of the high-layer signaling, and the frequency domain granularity is determined according to the determined time domain granularity; or the frequency domain granularity is determined by indication of the physical layer signaling or configuration of the high-layer signaling, and the time domain granularity is determined according to the determined frequency domain granularity. Thus, the problem can be solved about indicating a resource of a service receiving side with long transmission duration pre-empted by a service with short transmission duration, and the effect can be achieved on indicating the resource of the service receiving side with long transmission duration pre-empted by the service with short transmission duration.

The technical solution of the above-mentioned step 102 can also understood as: indicating, in a configured time-frequency resource region, a time-frequency resource of a service with first transmission duration pre-empted by a service with second transmission duration by physical layer signaling, where the first transmission duration is larger than the second transmission duration. a determining manner of the time domain granularity and the frequency domain granularity of the time-frequency resource for indicating a time-frequency resource of a service with first transmission duration pre-empted by a service with second transmission duration includes: one granularity of the time domain granularity and the frequency domain granularity is determined at least by one of the following manners: indication of the physical layer signaling or configuration of the high-layer signaling; the other granularity of the time domain granularity and the frequency domain granularity is determined at least by the following manner: a granularity having been determined by indication of the physical layer signaling or configuration of the high-layer signaling; or a combination of the time domain granularity and the frequency domain granularity is determined by one of the following manners: indication of the physical layer signaling or configuration of the high-layer signaling.

In an embodiment of the present disclosure, a time domain region in the time-frequency resource region is one or more slots, or one or more orthogonal frequency division multiplexing (OFDM) symbols, and corresponding subcarrier spacing can be configured at the same time. A frequency domain region is one or more physical resource blanks (RB), or one or more resources blank groups (RBGs).

In an embodiment of the present disclosure, the service with the first transmission duration is an enhanced mobile broadband (eMBB) service, which occupies one slot and includes 14 OFDM symbols; and the service with the second transmission duration is an ultra-reliable low-latency communication (URLLC) service, which occupies two OFDM symbols, but it is not limited thereto.

Hereinafter, the above technical solution will be illustrated with reference to an embodiment. The time domain granularity is determined at least by one of the following manners: when it is indicated by the physical layer signaling and configured by high-layer signaling, the frequency domain granularity is determined by the determined time domain granularity (that is, the frequency domain granularity is determined according to the determined time domain granularity); and the frequency domain granularity is determined at least by one of the following manners: when it is indicated by the physical layer signaling and configured by the high-layer signaling, the time domain granularity is determined by the determined frequency domain granularity (that is, the frequency domain granularity is determined according to the determined time domain granularity).

The combination of the time domain granularity and the frequency domain granularity in an embodiment of the present disclosure can be understood as referring to a combination {x, y} of the time domain granularity x and the frequency domain granularity y.

That is, through the above embodiment, impact on performance of a service with a long transmission time is reduced, and the pre-empted resource is indicated to the receiving side; at the same time, the receiving side can remove error data when receiving and demodulating the service with a long transmission time, so as to avoid massive retransmitted data and accumulation and spread of the error data, and merely to transmit the pre-empted resource.

In an embodiment, the time domain granularity and/or the frequency domain granularity indicated by the physical layer signaling is an element of a set, where the set is a predefined set or a set notified by high-layer signaling.

In an embodiment, the set is determined as a set of elements having different values according to at least one of the following:

sizes of different time domain regions; in an embodiment, the time domain granularity is x OFDM symbols; when N=1 slot, the value set of x is 1, 2, 4, 7; and when N=2 slots, the value set of x is 2, 4, 7, 14;

sizes of different frequency domain regions; in an embodiment, the frequency domain granularity y is a certain proportion of the frequency domain region; when the frequency domain region includes 100 physical resource blocks (physical resource block, PRB), the value set of y includes 1, ½, ¼, ⅛; and when the frequency domain region includes 20 PRBs, the value set of y includes 1, ½; or sizes of different subcarrier spacing (subcarrier spacing, SCS); in an embodiment, the time domain granularity is x OFDM symbols; when the subcarrier spacing SCS=15 khz, the value set of x at least includes 1, 2; when SCS=30 khz, the value set of x at least includes 2, 4; and when for SCS=60 khz, the value set of x at least includes 7.

In an embodiment, the time domain granularity at least includes one of the following: symbols of a first specified number (one or more symbols), and a first predefined pattern; the frequency domain granularity at least includes one of the following: a bandwidth of a specified proportion, and a second predefined pattern; and in an embodiment of the present disclosure, the time domain granularity can be 1 or 2 or 4 or 7 OFDM symbols, and a predefined pattern can be [4, 4, 4, 2] symbols, and the pattern is not limited thereto.

The frequency domain granularity can be 1, ½, ¼ or ⅛ times of a frequency domain region bandwidth.

A frequency domain pattern can be a [¼, ¼, ¼, ½] times of the frequency domain region, and the pattern is not limited thereto.

In an embodiment, the symbols of the first specified number at least include one of the following: 1 orthogonal frequency division multiplexing (OFDM) symbol, 2 OFDM symbols, 4 OFDM symbols and 7 OFDM symbols.

In an embodiment, the indicating, in a configured time-frequency resource region, a time-frequency resource of a service with first transmission duration pre-empted by a service with second transmission duration by physical layer signaling includes: values of the time domain granularity being in one to one correspondence with values of the frequency domain granularity.

In an embodiment, the method further includes:
after the time domain granularity and the frequency domain granularity are determined in the configured time-frequency resource region, dividing a plurality of resource sub-block regions (or resource sub-blocks) in the time-frequency resource region according to the determined time domain granularity and the determined frequency domain granularity; and indicating the resource sub-blocks (or resource sub-blocks) pre-empted by the service with the second transmission duration by the physical layer signaling. The physical layer signaling in an embodiment of the present disclosure can be embodied by a bitmap, and each bit corresponds to a resource sub-block, to indicate whether it is punctured The time-frequency domain resource pre-empted by the resource sub-blocks is equal to the time domain granularity on the time domain, and is equal to the frequency domain granularity on the frequency domain.

In an embodiment, the indicating, in the configured time-frequency resource region, the time-frequency resource of the service with the first transmission duration pre-empted by the service with the second transmission duration by the physical layer signaling includes:
in condition that the time domain region of the time-frequency resource region includes a plurality of slots, indicating a slot position of the service with the first transmission duration pre-empted by the service with the second transmission duration, and a position of a pre-empted resource sub-block in a pre-empted slot; where in condition that the frequency domain granularity corresponding to the resource sub-blocks is an entire frequency domain region of the time-frequency resource region, determining the time domain granularity of a pre-empted symbol position in the pre-empted slot according to the number of the pre-empted slots; or independently determining the time domain granularity and the frequency domain granularity corresponding to the resource sub-block according to the number of the pre-empted slots.

In an embodiment, in condition that the frequency domain granularity corresponding to the resource sub-block is an entire frequency domain region of the time-frequency resource region, determining time domain granularity of a pre-empted symbol position in the pre-empted slot according to the number of the pre-empted slots further includes:
in condition that the number of punctured slots on the time domain region of the time-frequency resource region is X1 and X2 respectively, the selected time domain granularity is Y1 OFDM symbols and Y2 orthogonal frequency division multiplexing (OFDM) symbols respectively; and when X1<X2, Y1≤Y2 is satisfied.

When the number of punctured slots on the time domain region in the time-frequency resource region is one, the selected time domain granularity is one orthogonal frequency division multiplexing (OFDM) symbol.

When the number of punctured slots on the time domain region in the time-frequency resource region is two, the selected time domain granularity is two OFDM symbols.

When the number of punctured slots on the time domain region in the time-frequency resource region is four, the selected time domain granularity is seven OFDM symbols.

When the number of punctured slots on the time domain region in the time-frequency resource region is eight, the selected time domain granularities is 14 OFDM symbols.

In an embodiment, the method further includes: indicating a slot position (or slot) of a service with first transmission duration pre-empted by the service with second transmission duration through a bitmap manner; determining the time domain granularity and frequency domain granularity according to the number of the pre-empted slots; or determining at least one of the time domain granularity and frequency domain granularity through the indication of the physical layer signaling; dividing, according to the determined time domain granularity and the determined frequency domain granularity, a plurality of resource sub-blocks in the pre-empted slot; and indicating the pre-empted resource sub-blocks in the pre-empted slot through the bitmap manner.

In an embodiment, the method further includes: a determining manner in which the time domain granularity is configured or indicated as the subcarrier spacing corresponding to x OFDM symbols is: the same as the subcarrier spacing of the service with the first transmission duration; or configuring the subcarrier spacing corresponding to x OFDM symbols at the same time of configuring or indicating x OFDM symbols, where the x is a positive integer.

In an embodiment, the time domain region in the time-frequency resource region is configured as N slots by the high-layer signaling, where a value range of the N is determined at least according to one of the following determining manners:
determining different value ranges of the N respectively according to a low frequency communication scenario and a high frequency communication scenario; in an embodiment of the present disclosure, the low frequency communication scenario or the high frequency communication scenario that is less than 6 GHz is referred to as the low frequency communication scenario, and that is greater than 6 GHz is referred to as the high frequency communication scenario with the same frequency; or 2 GHz or less corresponding to 4G communication is referred to as the low frequency communication scenario, and what is greater than 2 GHz, such as 3.5 GHz, is referred to as the high frequency communication scenario; but it is not limited thereto;
determining, according to a monitoring period that is C slots, where the monitoring period is configured to monitor the physical layer signaling, and the value of the N is not greater than the C; in an embodiment, N=C, N=C−1 or N=C/2; and
determining, according to processing delay that is k slots, with the value of the N no greater than k; in an embodiment, N=k, N=k−1 or N=k/2; where k is the processing delay of a user equipment (UE) that receives the service with the first transmission duration, or an average k value of a group of UEs in which the UE is located, or a minimum k value of a group of UEs in which the UE is located, or a maximum k value of a group of UEs in which the UE is located.

A notification indicates the pre-empted slot position, and the pre-empted symbol position in the pre-empted slot, where the time domain granularity of the pre-empted symbol position in the pre-empted slot is determined according to the number of the pre-empted slot positions; that is, in an embodiment of the present disclosure, when the number of the pre-empted slots is small, the time domain granularity of the pre-empted OFDM symbol position indicated in the pre-empted slot is smaller; otherwise, when the number of the pre-empted slots is large, the time domain granularity of the pre-empted OFDM symbol position indicated in the pre-empted slot is larger. That is, the time domain granularity of the pre-empted OFDM symbol position indicated in the pre-empted slot is determined according to the number of the pre-empted slots.

In an embodiment, in condition that the time domain region in the time-frequency resource region is configured as X1 slots and X2 slots respectively, the time domain granularity configured by the high-layer signaling is Y1 OFDM symbols and Y2 OFDM symbols respectively, and when X1<X2, Y1≤Y2 is satisfied.

From the description of the above embodiment, those skilled in the art can clearly understand that according to the method of the above embodiment, it can be achieved by software with a necessary general hardware platform, and certainly it can also be achieved only by hardware, but the former is a better implementation under many conditions. Based on such understanding, the substance of the technical solution of the present disclosure can be embodied in the form of a software product, and the computer software product is stored in a storage medium (such as a read-only memory (Read-Only Memory, ROM)/a random access memory (random access memory, RAM), a disk, an optical disk, which includes multiple instructions enabling one terminal equipment (which can be a mobile phone, a computer, a server, a network equipment or the like) to execute one or more methods described in the embodiments of the present disclosure.

Embodiment 2

The present embodiment further provides an apparatus for indicating a resource, and the apparatus is configured to implement the above embodiment, and what has been illustrated will not be repeated redundantly. As used hereinafter, the term "module" can implement a combination of software and/or hardware with a predetermined function. Although the apparatuses described in the following embodiment is preferably implemented by software, the implementation of hardware or a combination of software and hardware is also possible and conceivable.

Figure 2:
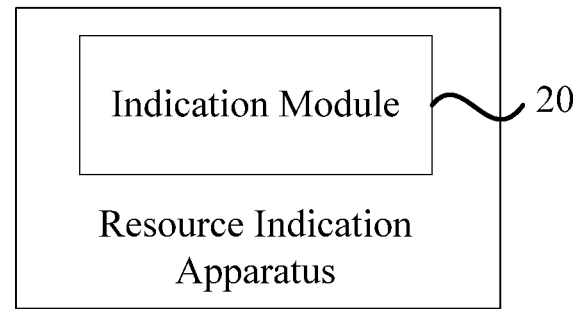
FIG. 2 is a block diagram of an apparatus for indicating a resource according to an embodiment of the present disclosure.

FIG. 2 is a block diagram of an apparatus for indicating a resource according to an embodiment of the present disclosure. As shown in FIG. 2, the apparatus includes: an indication module 20, which is configured to indicate, in a configured time-frequency resource region, a time-frequency resource of a service with first transmission duration pre-empted by a service with second transmission duration by physical layer signaling, where the first transmission duration is larger than the second transmission duration.

In an embodiment, a determining manner for a time domain granularity and a frequency domain granularity corresponding to the time-frequency resource of the service with the first transmission duration pre-empted by the service with the second transmission duration at least includes one of the following: both the time domain granularity and the frequency domain granularity are indicated by the physical layer signaling or configured by high-layer signaling; the time domain granularity is determined by indication of the physical layer signaling or configuration of the high-layer signaling, and the frequency domain granularity is determined according to the determined time domain granularity; or the frequency domain granularity is determined by indication of the physical layer signaling or configuration of the high-layer signaling, and the time domain granularity is determined according to the determined frequency domain granularity.

Through the present disclosure, since the time-frequency resource of the service with the first transmission duration pre-empted by the service with the second transmission duration can be indicated by the physical layer signaling in the configured time-frequency resource region, where the first transmission duration is larger than the second transmission duration, and where a determining manner of the time domain granularity and the frequency domain granularity includes: one granularity of the time domain granularity and the frequency domain granularity is determined at least by one of the following manners: indication of the physical layer signaling or configuration of the high-layer signaling; the other granularity of the time domain granularity and the frequency domain granularity is determined at least by the following manner: a granularity having been determined by indication of the physical layer signaling or configuration of the high-layer signaling; or a combination of the time domain granularity and the frequency domain granularity is determined by one of the following manners: indication of the physical layer signaling or configuration of the high-layer signaling. Thus, the problem can be solved about indicating a resource of a service receiving side with long transmission duration pre-empted by a service with short transmission duration, and the effect can be achieved on indicating the resource of the service receiving side with long transmission duration pre-empted by the service with short transmission duration.

In an embodiment of the present disclosure, the time domain region in the time-frequency resource region is one or more slots, or one or more OFDM symbols, and corresponding subcarrier spacing can be configured at the same time. The frequency domain region is one or more physical resource blanks (RB), or one or more resources blank groups (RBG).

In an embodiment of the present disclosure, the service with the first transmission duration is an eMBB service, which occupies one slot and includes 14 OFDM symbols; and the service with the second transmission duration is a URLLC service, which occupies two OFDM symbols, but it is not limited thereto.

In an embodiment of the present disclosure, the time domain granularity and/or the frequency domain granularity indicated by the physical layer signaling is an element in a set, where the set is a predefined set or a set notified by high-layer signaling.

In an embodiment of the present disclosure, the set is determined as a set having different values of elements according to at least one of the following:
  sizes of different time domain regions; in an embodiment, the time domain granularity is x OFDM symbols; when N=1 slot, the value set of x is 1, 2, 4, 7; and when N=2 slots, the value set of x is 2, 4, 7, 14;
  sizes of different frequency domain regions; in an embodiment, the frequency domain granularity y is a certain proportion of the frequency domain region; when the frequency domain region includes 100 PRBs, the value set of y includes 1, ½, ¼, ⅛; and when the frequency domain region includes 20 PRBs, the value set of y includes 1, ½; or
  sizes of different subcarrier spacing; in an embodiment, the time domain granularity is x OFDM symbols; when the subcarrier spacing SCS=15 khz, the value set of x at least includes 1, 2; when SCS=30 khz, the value set of x at least includes 2, 4; and when SCS=60 khz, the value set of x at least includes 7.

In an embodiment, the time domain granularity at least includes one of the following: symbols of a first specified number (one or more symbols), and a first predefined pattern; and the frequency domain granularity at least includes one of the following: a bandwidth of a specified proportion, and a second predefined pattern; and in an embodiment of the present disclosure, the time domain granularity can be 1 or 2 or 4 or 7 OFDM symbols, and a predefined pattern can be [4, 4, 4, 2] symbols, and the pattern is not limited thereto.

The frequency domain granularity can be 1 or ½ or ¼ or ⅛ times of a frequency domain region bandwidth.

A frequency domain pattern can be a [¼, ¼, ¼, ½] times of the frequency domain region, and the pattern is not limited thereto.

In an embodiment of the present disclosure, the symbols of the first specified number at least include one of the following: one orthogonal frequency division multiplexing (OFDM) symbol, two OFDM symbols, four OFDM symbols and seven OFDM symbols.

In an embodiment of the disclosure, the indicating, in a configured time-frequency resource region, a time-frequency resource of a service with first transmission duration pre-empted by a service with second transmission duration by the physical layer signaling includes: values of the time domain granularity being in one to one correspondence with values of the frequency domain granularity.

In an embodiment of the disclosure, after the time domain granularity and the frequency domain granularity are determined in the configured time-frequency resource region, a plurality of resource sub-block regions (or resource sub-blocks) in the time resource region are divided according to the determined time domain granularity and the determined frequency domain granularity; and the resource sub-block regions (or resource sub-blocks) pre-empted by the service with the second transmission duration are indicated by the physical layer signaling through a bitmap manner (that is, the physical layer signaling in the embodiment of the present disclosure can be represented by a bitmap); and in the embodiment of the present disclosure, the time-frequency domain resource pre-empted by the resource sub-blocks is equal to the time domain granularity on the time domain, and is equal to the frequency domain granularity on the frequency domain.

In an embodiment of the present disclosure, a slot position of the service with the first transmission duration pre-empted by the service with the second transmission duration, and a position of pre-empted resource sub-blocks in a pre-empted slot are indicated, when the time domain region in the time-frequency resource region includes a plurality of slots; where when the frequency domain granularity corresponding to the resource sub-blocks is an entire frequency domain region in the time-frequency resource region, the time domain granularity of the pre-empted symbol position in the pre-empted slot is determined according to the number of the pre-empted slots; or the time domain granularity and the frequency domain granularity corresponding to the resource sub-blocks are independently determined according to the number of the pre-empted slots.

In an embodiment of the present disclosure, in condition that the frequency domain granularity corresponding to the resource sub-blocks is an entire frequency domain region in the time-frequency resource region, the time domain granularity of the pre-empted symbol position in the pre-empted slot is determined according to the number of the pre-empted slots includes: in condition that the number of punctured slots on the time domain region in the time-frequency resource region is X1 and X2 respectively, the selected time domain granularity is Y1 OFDM symbols and Y2 orthogonal frequency division multiplexing (OFDM) symbols respectively; and when X1<X2, Y1≤Y2 is satisfied.

When the number of punctured slots on the time domain region in the time-frequency resource region is one, the selected time domain granularity is one OFDM symbol.

When the number of punctured slots on the time domain region in the time-frequency resource region is two, the selected time domain granularity is two OFDM symbols.

When the number of punctured slots on the time domain region in the time-frequency resource region is four, the selected time domain granularity is seven OFDM symbols.

When the number of punctured slots on the time domain region in the time-frequency resource region is eight, the selected time domain granularities is 14 OFDM symbols.

In an embodiment of the present disclosure, an indication module is further configured to indicate the slot position (or slot) of the service with the first transmission duration pre-empted by the service with second transmission duration through a bitmap manner; to determine the time domain granularity and frequency domain granularity, according to the number of the pre-empted slots; or to determine at least one of the time domain granularity and frequency domain granularity through the indication of the physical layer signaling; to divide, according to the determined time domain granularity and the determined frequency domain granularity, a plurality of resource sub-blocks in the pre-empted slot; and to indicate the pre-empted resource sub-blocks in the pre-empted slot through the bitmap manner.

In an embodiment of the present disclosure, a determining manner in which the time domain granularity is configured or indicated as the subcarrier spacing corresponding to x OFDM symbols is: the same as the subcarrier spacing of the service with the first transmission duration; or configuring the subcarrier spacing corresponding to x OFDM symbols at the same time of configuring or indicating x OFDM symbols, where the x is a positive integer.

In an embodiment of the present disclosure, the time domain region in the time-frequency resource region is configured as N slots by the high-layer signaling, where a value range of the N is determined at least according to one of the following determining manners:
  determining different value ranges of the N respectively according to a low frequency communication scenario and a high frequency communication scenario;
  determining, according to a monitoring period that is C slots, where the monitoring period is configured to monitor the physical layer signaling, and the value of the N is not greater than the C; in an embodiment, N=C, N=C−1, or N=C/2; and
  determining, according to processing delay that is k slots, with the value of the N no greater than k; in an embodiment, N=k, N=k−1, or N=k/2; where k is the processing delay of a UE that receives the service with the first transmission duration, or an average k value of a group of UEs in which the UE is located, or a minimum k value of a group of UEs in which the UE is located, or a maximum k value of a group of UEs in which the UE is located.

The notification indicates the pre-empted slot position, and the pre-empted symbol position in the pre-empted slot, where the time domain granularity of the pre-empted symbol position in the pre-empted slot is determined according to the number of the pre-empted slot positions; that is, in an embodiment of the present disclosure, when the number of the pre-empted slots is small, the time domain granularity of the pre-empted OFDM symbol position indicated in the pre-empted slot is smaller; otherwise, when the number of the pre-empted slots is large, the time domain granularity of the pre-empted OFDM symbol position indicated in the pre-empted slot is larger. That is, the time domain granularity of the pre-empted OFDM symbol position indicated in the pre-empted slot is determined according to the number of the pre-empted slots.

In an embodiment, when the time domain region in the time-frequency resource region is configured as X1 slots and X2 slots respectively, the time domain granularity configured by the high-layer signaling is Y1 OFDM symbols and Y2 OFDM symbols respectively, and when X1<X2, Y1≤Y2 is satisfied.

The above one or more modules can be implemented by software or hardware; for the latter, it can be implemented by the following manner, but is not limited hereto: the above modules are located in a same processor; or the above one or more modules is respectively located in different processors in any combination.

Embodiment 3

Hereinafter, the above resource indication flow is illustrated combined with the embodiments, but is not used to limit the technical solution of the embodiments of the present disclosure.

Instance 1

A base station transmits a physical downlink shared channel (PDSCH) 1 to a terminal A, and a transmission duration of the PDSCH1 is T1 (corresponding to the first transmission duration of the above embodiment). In the present embodiment, T1 is one slot, which is taken as an example, and includes 14 OFDM symbols, but it is not limited thereto. T1 can also be other time units. In the PDSCH1 transmission, the base station further transmits PDSCH2 to a terminal B, and a transmission time of the PDSCH2 is T2 (corresponding to the second transmission duration of the above embodiment); T2<T1 or T2≤T1. In the present embodiment, T2 is OFDM or an OFDM symbol group, which is taken as an example, and it is not limited thereto. T2 can also be other time units. Some or all of resources used by the PDSCH2 are pre-empted from the PDSCH1, that is, the PDSCH1 is punctured and transmitted. In a next slot, the base station notifies the terminal A of puncturing indication, that is, the PDSCH2 pre-empts resource indication. A puncturing indication manner includes at least one of the following:

Example one: merely a time domain resource is indicated.

For example, the OFDM symbol is an indication granularity, and the numbers of punctured time domain symbols and positions are indicated as 1, 2, . . . , L, where L is the number of OFDM symbols included in the slot. In the present example, L=14. At this time, a bitmap manner of 14 bits is used to indicate a position of a punctured symbol. That is, the present example only takes the OFDM symbol as an example; it can be other time units, such as a symbol group. In condition that the symbol group includes 2 OFDM symbols, a bitmap of 7 bits can be used. In condition that the symbol group includes 3 or 4 symbols and 14 symbols are divided as a 4-3-4-3 symbol group, a bitmap of 4 bits can be used. In condition that the symbol group includes 2 or 3 symbols and the 14 symbols are divided as a 3-2-2-2-2-3 symbol group, a bitmap of 6 bits can be used. The rest are similar and will not be repeated redundantly.

For another example, the OFDM symbol is the indication granularity, and the numbers of punctured time domain symbols and positions are indicated as 1, 2, . . . , L, where 0<N<L, and L is the number of OFDM symbols included in the slot. For example, when L=14 and N=4, at this time a total state number is indicated as =14+91+364+1001=1470; when the number of puncturing symbols is greater than 4, punctured resources are considered too many at this time, all are indicated to be punctured, and 1 state indication is required at this time. That is, the number of bits is indicated as =11 bits. That is, the present example merely takes the OFDM symbol as an example, it can be other time units, such as the symbol group. In condition that the symbol group includes 2 OFDM symbols, and the number of punctured symbol groups is indicated as 1, 2, . . . N symbols and positions, where 0<N<L, and L is the number of OFDM symbols included in the slot. For example, when L=7 and N=2, at this time a total state number is indicated as =7+21=28; when the number of the puncturing symbols is greater than 2, the punctured resources are considered too many at this time, all are indicated to be punctured, and 1 state indication is required at this time, that is, the number of bits is indicated as =5 bits. The rest are similar and will not be repeated redundantly.

Example two: the time domain resource and a frequency domain resource are indicated respectively.

For example, the time domain is indicated as the same method shown in Example 1. The frequency domain resource is indicated as: equal spacing proportional coefficient indication or unequal spacing proportional coefficient indication. The equal spacing proportional coefficient indication incudes: 1 bit is used to indicate punctured 50% and 100% of the frequency domain resource; or 2 bits are used to indicate punctured 25%, 50%, 75% and 100% of the frequency domain resource; or 2 bits are used to indicate punctured 20%, 40%, 60% and 80% of the frequency domain resource. The unequal spacing proportional coefficient indication includes: 1 bit is used to indicate punctured 30% and 100% of the frequency domain resource; or 2 bits are used to indicate 10%, 30%, 50% and 100% of the frequency domain resource.

Example three: the time domain resource and the frequency domain resource are indicated jointly.

A punctured two-dimensional resource unit U is indicated by a bitmap manner of fixed bit overhead, where one of the time domain granularity and the frequency domain granularity is obtained by pre-definition or configuration, and the other granularity of the time domain granularity and the frequency domain granularity are implicitly obtained combined with the two-dimensional resource unit U.

Figure 3:
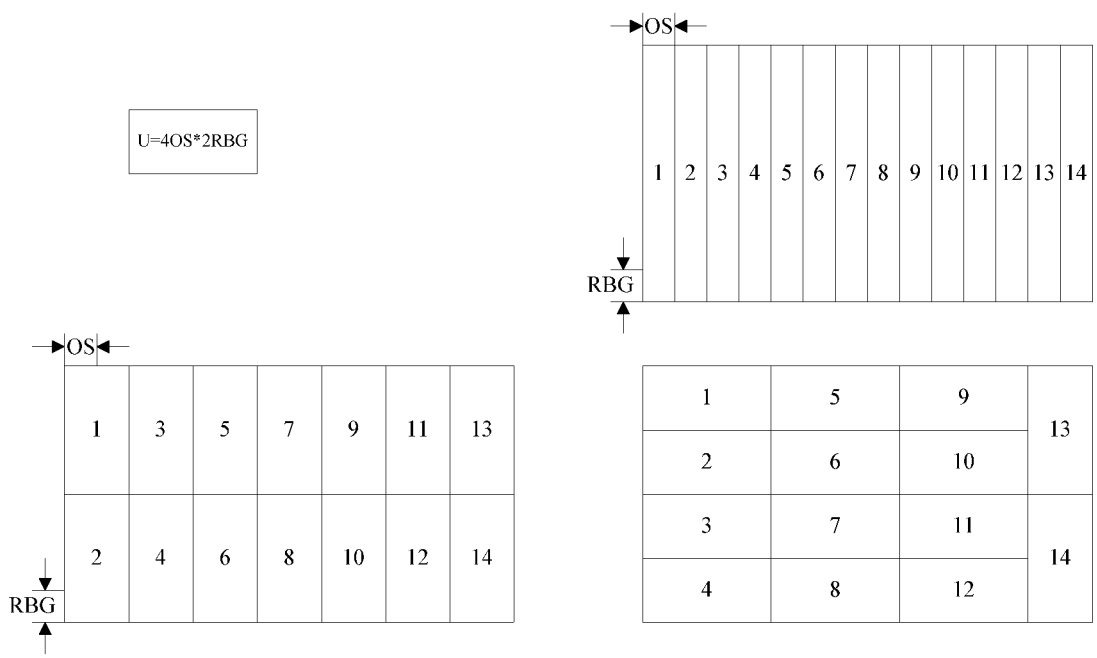
FIG. 3 is a schematic diagram of two-dimensional resource units of a fixed number according to an embodiment of the present disclosure.

It is assumed that a time domain granularity T is an OFDM symbol or an OFDM symbol group, and a frequency domain granularity F is an RBG or RBG group. The two-dimensional resource unit is defined as U time-frequency resource blocks (for example: an OFDM symbol, which is abbreviated as OS)*RBG, a unit of the time domain is OS, and a unit of the frequency domain is RBG). For example, U=8 (OS*RBG) is defined, the time domain granularity T can be configured as one of 1, 2 and 4 OFDM symbols, and the frequency domain granularity F=U/T is one of 8, 4 and 2 RBGs at this time. The puncturing indication is always 14 bits, indicating that a punctured/pre-empted resource is one or more of U1 to U14. As shown in FIG. 3, the time domain range is indicated as 1 slot including 14 OFDM symbols, and the frequency domain range is indicated as 8 RBGs; when the time domain granularity T is 1, 2, 4 OSs, and the frequency domain granularity F is 8, 4, 2 RBGs, a punctured/pre-empted number and position in a total of 14 two-dimensional resource units is always indicated by a bitmap of 14 bits. In an embodiment, when the time domain range cannot exactly divide the time domain granularity, two types of time domain granularity are allowed to exist simultaneously, but the number of two-dimensional resource units remains the same; or when the frequency domain range cannot exactly divide the frequency domain granularity, two types of frequency domain granularity are allowed to exist simultaneously, but the number of two-dimensional resource units remains the same.

Example four: the time domain resource and the frequency domain resource are jointly indicated.

The punctured time-frequency resource region is indicated by a compressed state manner, where the time domain granularity in the time-frequency resource region is obtained by being indication or predefinition or configuration by downlink control information (DCI), and the frequency domain granularity is implicitly determined by the time domain granularity.

It is assumed that a time domain granularity T is an OFDM symbol or an OFDM symbol group, and a frequency domain granularity F is an RBG or RBG group. The two-dimensional resource unit is defined as U OS*RBGs. For example, U=8 (OS*RBG) is defined, the time domain granularity T can be configured as one of 1, 2 and 4 OFDM symbols, and the frequency domain granularity F=U/T is one of 8, 4 and 2 RBGs at this time. The puncturing indication is merely used for the case that the number of puncturing units is no more than P. For example, when P=4, it is always divided into Q=14 puncturing units as shown in FIG. 3, which are numbered as 1-14 or 0-13; at this time a total state number is indicated as =14+91+364+1001=1470. When the number of puncturing units is greater than 4, the punctured resources are considered too many at this time, all are indicated to be punctured, and 1 state indication is required at this time, that is, the number of bits is indicated as =11 bits.

Through a method for indicating a resource described in the present embodiment, the resource indication adapted to a same time domain granularity and different time domain granularities can be implemented in the case of fixed indicating overhead, so that punctured data transmission can obtain a position of a puncturing resource, so as to avoid massive retransmitted data and accumulation and spread of the error data, only to transmit the pre-empted resource, and to improve the spectrum efficiency of a system.

Instance 2

A base station transmits PDSCH1 to a terminal A, and a transmission time of the PDSCH1 is T1. In the present embodiment, T1 is N slots, which is taken as an example, and the N is a positive integer. Where one slot includes 14 OFDM symbols, and it is not limited thereto. T1 can also be other time units. In the PDSCH1 transmission, the base station further transmits PDSCH2 to a terminal B, and a transmission time of the PDSCH2 is T2; T2<T1 or T2≤T1. In the present embodiment, T2 is OFDM or an OFDM symbol group, which is taken as an example, and it is not limited thereto. T2 can also be other time units. Some or all of resources used by the PDSCH2 are pre-empted from the PDSCH1, that is, the PDSCH1 is punctured and transmitted. The base station notifies the terminal A of puncturing indication in a slot corresponding to a pre-configured monitoring period, including but not limited to a PDSCH2 pre-empted resource; the indicated time domain resource region is N slots and a pre-configured frequency domain range, the indicated time domain granularity is x OFDM symbols, and the indicated frequency domain granularity is y RB s. A puncturing indication manner includes at least one of the following:

Example one: merely the time domain resource is indicated.

For example, when N=1 slot is configured, x=1 OFDM symbol is used as an indication granularity.

The numbers of punctured time domain symbols and positions are indicated as 1, 2, . . . , L, where L is the number of OFDM symbols included in the slot. In the present example, L=14. At this time, a bitmap manner of 14 bits is used to indicate a position of the punctured symbol. That is, the present example merely takes the OFDM symbol as an example, it can be other time units, such as a symbol group. In condition that the symbol group includes 2 OFDM symbols, a bitmap of 7 bits can be used. In condition that the symbol group includes 3 or 4 symbols and 14 symbols are divided as a 4-3-4-3 symbol group, a bitmap of 4 bits can be used. In condition that the symbol group includes 2 or 3 symbols and the 14 symbols are divided as a 3-2-2-2-2-3 symbol group, a bitmap of 6 bits can be used. The rest are similar and will not be repeated redundantly.

For another example, an OFDM symbol is an indication granularity, and the numbers of punctured time domain symbols and positions are indicated as 1, 2, . . . , M, where 0<M<L, and L is the number of OFDM symbols included in the slot. For example, when L=14 and M=4, a total state number is indicated as =14+91+364+1001=1470 at this time. When the number of puncturing units is greater than 4, the punctured resources are considered too many at this time, all are indicated to be punctured, and 1 state indication is required at this time, that is, the number of bits is indicated as 11 bits. That is, the present example only takes the OFDM symbol as an example; it can be other time units, such as the symbol group. In condition that the symbol group includes 2 OFDM symbols, the number of punctured symbol groups is indicated as 1, 2, . . . M symbols and positions, where 0<M<L, and L is the number of OFDM symbols included in the slot. For example, when L=7 and M=2, a total state number is indicated as =7+21=28 at this time. When the number of puncturing units is greater than 2, the punctured resources are considered too many at this time, all are indicated to be punctured, and 1 state indication is required at this time. That is, the number of bits is indicated as 5 bits. The rest are similar and will not be repeated redundantly.

Example two: the time domain resource and the frequency domain resource are indicated respectively.

For example, the time domain is indicated as the same method shown in Example 1. The frequency domain resource is indicated as: equal spacing proportional coefficient indication or unequal spacing proportional coefficient indication. The equal spacing proportional coefficient indication includes: 1 bit is used to indicate punctured 50% and 100% of the frequency domain resource; or 2 bits are used to indicate punctured 25%, 50%, 75% and 100% of the frequency domain resource; or 2 bits are used to indicate punctured 20%, 40%, 60% and 80% of the frequency domain resource. The unequal spacing proportional coefficient indication includes: 1 bit is used to indicate punctured 30% and 100% of the frequency domain resource; or 2 bits are used to indicate 10%, 30%, 50% and 100% of the frequency domain resource.

Example three: the time domain resource and the frequency domain resource are jointly indicated.

The punctured time-frequency resource region is indicated by a bitmap manner or a state compression manner, where the time domain granularity in the time-frequency resource region is obtained by indication or configuration of DCI, and the frequency domain granularity is obtained by implicit determination or configuration of the time domain granularity.

It is assumed that the time domain granularity is x OFDM symbols and the frequency domain granularity is y RBs or RBGs. The time-frequency domain region to be indicated includes N slots on the time domain, and bandwidth (BW) on the frequency domain includes Y RBs.

Manner one: the time domain granularity is obtained by the indication or the configuration of the DCI, and the frequency domain granularity is implicitly obtained by the time domain granularity. The two-dimensional resource unit is defined as U OS*RBGs. For example, U=8 (OS*RBG) is defined, the time domain granularity x can be configured as one of 1, 2 and 4 OFDM symbols, the frequency domain granularity y=U/x is one of 8, 4 and 2 RBGs at this time, and the puncturing indication is always 14 bits, indicating that the punctured/pre-empted resource is one or more of U1 to U14. As shown in FIG. 3, the time domain range is indicated as N=1 slot including 14 OFDM symbols, and the frequency domain range is indicated as 8 RBGs; when the time domain granularity x is 1, 2, 4 OSs, and the frequency domain granularity y is 8, 4, 2 RBGs, the punctured/pre-empted number and position in a total of 14 two-dimensional resource units is always indicated by a bitmap (such as 14 bits) of fixed overhead. In an embodiment, when the time domain range cannot exactly divide the time domain granularity, two types of time domain granularity are allowed to exist simultaneously, but the number of two-dimensional resource units remains the same; or when the frequency domain range cannot exactly divide the frequency domain granularity, two types of frequency domain granularity are allowed to exist simultaneously, but the number of two-dimensional resource units remains the same.

Or, for example, the time domain range is indicated as N=1 slot, including 14 OFDM symbols, the frequency domain range is indicated as 8 RBGs, and when the time domain granularity x is 1, 2, 4 OSs, the frequency domain granularity y is 8, 4, 2 RBGs. Puncturing position state compression indication is that, after Q=14 puncturing units are divided by a certain time domain granularity and frequency domain granularity in the resource region, no more than P=4 punctured/pre-empted numbers and positions in the two-dimensional resource units are indicated by 11 bits, where a determining method of 11 bits is: at this time a total state number is indicated as =14+91+364+1001=1470; when the number of puncturing units is greater than 4, the punctured resources are considered too many at this time, all are indicated to be punctured, and 1 state indication is required at this time, that is, the number of bits is indicated as 11 bits.

Manner two: the time domain granularity is obtained by the indication or the configuration of the DCI, and the frequency domain granularity is implicitly obtained by the time domain granularity. The time domain granularity x can be configured as one of 1, 2, 4, 7 OFDM symbols or a predefined pattern, at this time the frequency domain granularity y can be configured as one of 100% BW, 50% BW, 25% BW or a predefined pattern, and the puncturing indication is always a fixed number of bits, such as 14 bits, or 16 bits, indicating that the punctured/pre-empted resources are one or more of U1 to U14, or U1 to U16. Moreover, it is satisfied that x and y are in one-to-one correspondence, as some possible combinations shown in Table 1; and at this time indicating overhead is fixed. When BW=8 RBGs, part of the combinations are as shown in FIG. 3, where a determining manner of the subcarrier spacing corresponding to x includes: (Manner 1) the same as the subcarrier spacing used by the service with the pre-empted resource; for example, when the URLLC service pre-empts eMBB service resource transmission, the subcarrier spacing corresponding to x is the same as subcarrier spacing used by an eMBB service at this time. (Manner 2) When configuring the value of x, the corresponding subcarrier spacing is configured at the same time. For example, at least one of the following values is configured: x=1 and corresponds to SCS=15 khz, x=2 and corresponds to SCS=15 khz, x=1 and corresponds to SCS=30 khz, x=2 and corresponds to SCS=30 khz, x=4 and corresponds to SCS=30 khz, and x=7 and corresponds to SCS=60 khz.

TABLE 1

Puncturing indication granularity table

| Time domain region range (N slots) | Indication index | Time domain granularity (x OFDM symbols) | Frequency domain granularity (y RBs) (a proportion of occupied bandwidth) | Indicating overhead (bits) |
|---|---|---|---|---|
| 1 | 1 | 1 | 100% BW | 14 |
| 1 | 2 | 2 | 50% BW | 14 |
| 1 | 3 | Predefined Pattern [4, 4, 4, 2] | Predefined Pattern [25%, 25%, 25%, 50%]BW | 14 |
| 1 | 4 | 7 | Predefined Pattern, including 7 segments of sub-frequency domain regions | 14 |
| 2 | 1 | 2 | 100% BW | 14 |
| 2 | 2 | 4 | 50% BW | 14 |
| 2 | 3 | Predefined Pattern [4, 4, 4, 2, 4, 4, 4, 2] | Predefined Pattern [50%, 50%, 50%, 100%, 50%, 50%, 50%, 100%]BW | 14 |
| 2 | 4 | 7 | 25% BW | 16 |

The value of N that indicates the time domain range is configured by the high-layer signaling; and the number of included RBs that indicates the frequency domain range BW is configured by the high-layer signaling. First, after the time domain region N slots and the frequency domain range BW are configured by the high-level signaling, puncturing indication information includes time domain granularity x indication (which can also be referred to as index indication) and puncturing position bitmap indication.

For example, when N is configured as 1 slot, the time domain granularity x indication can be that x is indicated as one of 1, 2, 4 (predefined Pattern), 7 by using 2 bits as shown in Table 2-1; and the puncturing position bitmap indication is the punctured/pre-empted numbers and positions in a total of 14 two-dimensional resource units (which are also referred to as punctured sub-blocks) by 14 bits.

For another example, when N is configured as 2 slots, the time domain granularity x indication can be that x is indicated as one of 2, 4 (including the predefined pattern), 7 by using 2 bits as shown in Table 2-1; the puncturing position bitmap indication is the punctured/pre-empted numbers and positions in a total of 16 two-dimensional resource units (which are also referred to as punctured sub-blocks) by 16 bits.

For another example, after the value of N is obtained by configuration of the high-layer signaling, in the case of a certain determined N value, the number of possible combination cases of x and y is determined and indexed with numbers, and the numbers of the punctured sub-blocks corresponding to the combinations are the same. When punctured position information is indicated, an index corresponding to the combination of x and y is indicated, and it is indicated whether one or more sub-blocks divided in the case of a certain combination of x and y are punctured. As shown in Table 2 and Table 3, the indications of N=1 and N=2 use 2 bits to indicate that {x, y} is one of the indexes 0, 1, 2, and 3; and the punctured position indicates whether one or more sub-blocks divided in a certain {x, y} combination are punctured by the bit number of 14 bits. A DCI format corresponding to the puncturing indication is shown as Table 4.

TABLE 2

Puncturing indication granularity table when N = 1

| N (the number of slots) | Indication index | x (the number of symbols or a symbol pattern) | y (the proportion of allocated frequency band on the frequency domain) | Overhead (bits) |
|---|---|---|---|---|
| 1 | 0 | 1 | 1 | 14 |
| 1 | 1 | 2 | ½ | 14 |
| 1 | 2 | [4, 4, 4, 2] pattern | [¼, ¼, ¼, ½] pattern | 14 |
| 1 | 3 | 7 | [⅛, ⅛, ⅛, ⅛, ⅛, ⅛, ¼] pattern | 14 |

TABLE 3

Puncturing indication granularity table when N = 2

| N (the number of slots) | Indication index | x (the number of symbols or a symbol pattern) | y (the proportion of allocated frequency band on the frequency domain) | Overhead (bits) |
|---|---|---|---|---|
| 2 | 0 | 2 | 1 | 14 |
| 2 | 1 | 4 | ½ | 14 |
| 2 | 2 | [4, 4, 4, 2, 4, 4, 4, 2] pattern | [½, ½, ½, ½, ½, ½, ½, 1] pattern | 14 |
| 2 | 3 | 7 | [¼, ¼, ¼, ½] pattern | 14 |

TABLE 4

A DCI format for puncturing indication

| Bit field | Overhead (bits) |
|---|---|
| Cyclic Redundancy Check (CRC) | 16 |
| Indication index (Indication index) (the value of x (the value of x)) | 2 |
| Pre-empted sub-blocks indication (Pre-empted sub-blocks indication) | 14 |
| Total (Total) | 32 |

Or, the value of N that indicates the time domain range is configured by the high-layer signaling; and the number of included RBs that indicates the frequency domain range BW is configured by the high-layer signaling. First, after the time domain region N slots and the frequency domain range BW are configured by the high-level signaling, puncturing indication information includes the time domain granularity x indication and the puncturing position state compression indication. For example, when N is configured as 1 slot, the time domain granularity x indication can be that x is indicated as one of 1, 2, 4 (predefined Pattern), 7 by using 2 bits as shown in Table 2-1; the puncturing position state compression indication is that, after Q=14 puncturing units are divided by a certain time domain granularity and frequency domain granularity in the resource region, no more than P=4 punctured/pre-empted numbers and positions in the two-dimensional resource units are indicated by 11 bits, where a determining method of 11 bits is: at this time a total state number is indicated as =14+91+364+1001=1470; when the number of puncturing units is greater than 4, the punctured resources are considered too many at this time, all are indicated to be punctured, and 1 state indication is required at this time, that is, the number of bits is indicated as 11 bits.

Manner three: the time domain granularity is obtained by configuration, the frequency domain granularity is implicitly obtained by the time domain granularity, or obtained by pre-configuration, or obtained by jointly configuring the time-frequency domain. The time domain granularity x can be configured as one of 1, 2 OFDM symbols, or one of the predefined patterns, and the predefined pattern is as [3, 2, 2, 2, 2, 3] OFDM symbols, [4, 4 4, 2] OFDM symbols, and [4, 3, 4, 3] OFDM symbols; and the frequency domain granularity y can be configured as one of 100% BW, 50% BW, 25% BW or the predefined pattern. Or the time-frequency domain is jointly configured as {x, y}, such as {1, 100% BW}, {2, 50% BW}, {[4, 25% BW], [4, 25% BW], [4, 25% BW], [2, 50% BW]}, {[4, 25% BW], [3, 50% BW], [4, 25% BW], [3, 25% BW]}, etc. Puncturing indicating overhead is the variable number of bits according to different combinations of the time domain granularity and the frequency domain granularity, such as 10 bit, 12 bits, 14 bits, 16 bits, etc., indicating that the punctured/pre-empted resources are one of more of U1 to U10, U1 to U16 or U1 to a certain value.

The example predefined pattern in the present embodiment is only for reference, is not limited to all the above examples, and can be other predefined patterns (predefined Pattern), which will not be repeated redundantly.

By a method for indicating a resource described in the present embodiment, the resource indication adapted to a same time domain granularity and different time domain granularities can be implemented in the case of fixed indicating overhead or variable indicating overhead, so that punctured data transmission can obtain a position of a puncturing resource, so as to avoid massive retransmitted data and accumulation and spread of the error data, only to transmit the pre-empted resource, and to improve the spectrum efficiency of a system.

Instance 3

A base station transmits PDSCH1 to a terminal A, and a transmission time of the PDSCH1 is T1. In the present embodiment, T1 is 1 slot, which is taken as an example, and includes 14 OFDM symbols, and it is not limited thereto. T1 can also be other time units. In the PDSCH1 transmission, the base station further transmits PDSCH2 to a terminal B, and a transmission time of the PDSCH2 is T2; T2<T1 or T2≤T1; and in the present embodiment, T2 is OFDM or an OFDM symbol group, which is taken as an example, and it is not limited thereto. T2 can also be other time units. Some or all of resources used by the PDSCH2 are pre-empted from the PDSCH1, that is, the PDSCH1 is punctured and transmitted. The base station notifies the terminal A of puncturing indication in a slot that satisfies a period C, that is, the PDSCH2 pre-empts resource indication. That is, at this time the puncturing indication is sent once every C slot, and an indication manner to indicate and puncture the punctured/pre-empting resource in indicating N slots each time includes at least one of the following: where N<C and N=C.

Example one: merely the time domain resource is indicated. At this time, the frequency domain granularity is equal to the entire configured frequency domain region by default. At this time, the time domain granularity is determined according to the number of the punctured slots; when the number of punctured slots is small, the time domain granularity is small; otherwise, when the number of punctured slots is large, the time domain granularity is large. A notification indicates a position of the punctured slot, and a position of the punctured OFDM symbol in the punctured slot. Overhead is y bits, where the position of the punctured slot is indicated by using y1 bits, and the position of the punctured OFDM symbol in the punctured slot is indicated by using y2 bits; and y=y1+y2. Moreover, when y1 indicates that the number of punctured slots is small, y2 indicates that the time domain granularity of the punctured OFDM symbol position in the punctured slot is smaller; otherwise, when y1 indicates that the number of punctured slots is large, y2 indicates that the time domain granularity of the punctured OFDM symbol position in the punctured slot is larger. That is, the time domain granularity of the punctured OFDM symbol position in the punctured slot is determined according to the number of the punctured slots. A quantitative example is described as follows.

It is assumed that N=8, and y1=8 bits is used to indicate the position of the punctured slot, and y2=16 bits to indicate the time domain granularity of the position of the punctured OFDM symbol in the punctured slot, as shown in Table 5. That is, according to indication results of the first 8 bits, the indication granularity and meaning of the last 16 bits can be determined. A total overhead is y=y1+y2=8+16=24 bits. A corresponding DCI format is shown as Table 6.

TABLE 5

The puncturing indication granularity and overhead in a corresponding slot for the different numbers of punctured slots

| Slot granularity is punctured and indicated Bitmap of 8 bits | The possible state number | The punctured time domain granularity, indicating overhead/bits of a symbol (symbol) (group (group)) in the slot | Valid indication of overhead/bits, and the number of padding bits |
| --- | --- | --- | --- |
| 1 slot is punctured | 8 | Symbol, 14 | 14, padding 2 |
| 2 slots are punctured | 28 | 2-symbol, 7; or 2/3-symbol, 6 | 7*2 = 14, padding 2 6*2 = 12, padding 4 |
| 3 slots are punctured | 56 | 4/3-symbol, 4 | 4*3 = 12, padding 4 |
| 4 slots are punctured | 70 | 4/3-symbol, 4 | 4*4 = 16 |
| 5 slots are punctured | 56 | 7-symbol, 2 | 2*5 = 10, padding 6 |
| 6 slots are punctured | 28 | 7-symbol, 2 | 2*6 = 12, padding 4 |
| 7 slots are punctured | 8 | 7-symbol, 2 | 2*7 = 14, padding 2 |
| 8 slots are punctured | 1 | 7-symbol, 2 | 2*8 = 16 |
| 0 slots is punctured | 1 | Reserved | Reserved |

TABLE 6

A DCI format

| Bit field | Overhead (bits) |
| --- | --- |
| CRC | 16 |
| Pre-empted slots within N slots indication (Pre-empted slots within N slots indication) | N (e.g. 4 or 8) |
| Pre-empted sub-blocks in pre-empted slots indication (Pre-empted sub-blocks in pre-empted slots indication) | 16 |
| Total | 36 or 40 |

Example two: merely the time domain resource is indicated. The notification indicates the position of the punctured slot, and the position of the punctured OFDM symbol in the punctured slot. The overhead is y bits, where the position of the punctured slot is indicated by using y1 bits, and the position of the punctured OFDM symbol in the punctured slot is indicated by using y2 bits; and y=y1+y2. Moreover, when y1 indicates that the number of punctured slots is small, y2 indicates that the time domain granularity of the punctured OFDM symbol position in the punctured slot is smaller; otherwise, when y1 indicates that the number of punctured slots is large, y2 indicates that the time domain granularity of the punctured OFDM symbol position in the punctured slot is larger. That is, the time domain granularity of the punctured OFDM symbol position in the punctured slot is determined according to the number of the punctured slots. An example of quantification is as follows:

It is assumed that N=8, and y1=6 bits is used to indicate the position of the punctured slot and only to indicate 1, 2 punctured slots; and when the number of punctured slots is greater than 2, all are considered to be punctured. y2=14 bits indicates the time domain granularity of the position of the punctured OFDM symbol in the punctured slot, as shown in Table 7. That is, according to indication results of the first 8 bits, the indication granularity and meaning of the last 16 bits can be determined. A total overhead is y=y1+y2=8+14=22 bits.

TABLE 7

The puncturing indication granularity and overhead in a
corresponding slot for the different numbers of punctured slots

| Slot granularity is punctured and indicated Bitmap of 8 bits | The possible state number | The punctured time domain granularity, indicating overhead/bits of a symbol (group) in the slot | Valid indicating overhead/bits, and the number of padding bits in x shots |
|---|---|---|---|
| 1 slot is punctured | 8 | Symbol, 14 | 14, |
| 2 slots are punctured | 28 | 2-symbol, 7 2/3-symbol, 6 | 7*2 = 14, 6*2 = 12, padding 2 |
| More than 2 slots are punctured | 1 | Reserved | Reserved |

TABLE 8

The puncturing indication granularity and overhead in a corresponding
slot for the different numbers of punctured slots

| Slot granularity is punctured and indicated Bitmap of 8 bits | Index | The punctured time domain granularity (the number of symbols or symbol Patterns) of a symbol (group) in the slot | The frequency domain granularity (the proportion of occupied frequency band on the frequency domain) | Valid indicating overhead/ bits, and the number of padding bits |
|---|---|---|---|---|
| 1 slot is punctured | 0 | 1 | 1 | 14, padding 2 |
| | 1 | 2 | 1/2 | 14, padding 2 |
| | 2 | [4, 4, 4, 2] pattern | [1/4, 1/4, 1/4, 1/2] pattern | 14, padding 2 |
| | 3 | 7 | [1/8, 1/8, 1/8, 1/8, 1/8, 1/8, 1/4] pattern | 14, padding 2 |
| 2 slots are punctured | 0 | 2 | 1 | 14, padding 2 |
| | 1 | [4, 4, 4, 2] pattern | [2, 1/2, 1/2, 1/2, 1] pattern | 14, padding 2 |
| | 2 | 7 | [1/4, 1/4, 1/4, 1/4] pattern | 16, padding 0 |
| | 3 | 14 | [1/8, 1/8, 1/8, 1/8, 1/8, 1/8, 1/4] pattern | 14, padding 2 |
| 3 slots are punctured | 0 | [4, 4, 4, 2] pattern | 1 | 12, padding 4 |
| | 1 | [4, 4, 2, 2, 2] pattern | 1 | 15, padding 1 |
| | 2 | 7 | 1/2 | 12, padding 4 |
| | 3 | Reserved | Reserved | Reserved |
| 4 slots are punctured | 0 | [4, 4, 4, 2] pattern | 1 | 16, padding 0 |
| | 1 | 7 | 1/2 | 16, padding 0 |
| | 2 | 14 | 1/4 | 16, padding 0 |
| | 3 | 28 | 1/8 | 16, padding 0 |
| 5 slots are punctured | 0 | 7 | 1 | 10, padding 6 |
| | 1 | 14 | 1/2 | 10, padding 6 |
| | 2 | Reserved | Reserved | Reserved |
| | 3 | Reserved | Reserved | Reserved |
| 6 slots are punctured | 0 | 7 | 1 | 12, padding 4 |
| | 1 | 14 | 1/2 | 12, padding 4 |
| | 2 | 28 | 1/4 | 12, padding 4 |
| | 3 | Reserved | Reserved | Reserved |
| 7 slots are punctured | 0 | 7 | 1 | 14, padding 2 |
| | 1 | 14 | 1/2 | 14, padding 2 |
| | 2 | Reserved | Reserved | Reserved |
| | 3 | Reserved | Reserved | Reserved |
| 8 slots are punctured | 0 | 7 | 1 | 16, padding 0 |
| | 1 | 14 | 1/2 | 16, padding 0 |
| | 2 | 28 | 1/4 | 16, padding 0 |
| | 3 | 56 | 1/8 | 16, padding 0 |

Example 3: the time domain resource is indicated simultaneously. At this time, the time domain granularity and the frequency domain granularity are in one-to-one correspondence, and the time domain granularity and the frequency domain granularity can be independently determined when different numbers of slots are punctured, and a determining manner is as a manner of N=1 or N=2 in Embodiment 2. The notification indicates the position of the punctured slot, and the position of the punctured OFDM symbol in the punctured slot. The overhead is y bits, where the position of the punctured slot is indicated by using y1 bits, an index of the time domain granularity and the frequency domain granularity used in the punctured slot is indicated by using y2 bits, the position of the punctured two-dimensional time domain unit (punctured sub-block) in the punctured slot is indicated by using y3 bits, and y=y1+y2+y3. Moreover, when y1 indicates that the number of punctured slots is different, y2 indicates that a determining manner of the time domain granularity and the frequency domain granularity in the punctured slot is as shown in Instance 2, and y3 indicates whether one or more sub-blocks are punctured. That is, according to the number of punctured slots and the index indication of the combination of the time domain granularity and the frequency domain granularity, each sub-block division and whether it is punctured are determined. An example of quantification is as follows:

For example: it is assumed that N=8, and y1=8 bits is used to indicate the position of the punctured slot, y2=2 bits to indicate the index of the time domain granularity and the frequency domain granularity in the punctured slot, and y3=16 bits to indicate the time domain granularity of the position of the punctured OFDM symbol in the punctured slot, as shown in Table 8. That is, according to results of the number of the punctured slots indicated by the first 8 bits, and the index indication of 2 bits, the indication granularity and meaning of the last 16 bits can be determined. A total overhead is y=y1+y2+y3=8+2+16=26 bits. A corresponding DCI format is shown as Table 9.

The example predefined pattern in the present embodiment and instance is only for reference, is not limited to all the above examples, and can be other predefined patterns (predefined Pattern), which will not be repeated redundantly.

Through an embodiment of the present disclosure and a method for indicating a resource described in the embodiment, the resource indication adapted to different time domain granularities can be implemented in the case of fixed indicating overhead, so that punctured data transmission can obtain a position of a puncturing resource, so as to avoid massive retransmitted data and accumulation and spread of the error data, only to transmit the pre-empted resource, and to improve the spectrum efficiency of a system.

Instance 4

Based on the technical solution provided by any one of the foregoing Instances 1, 2, and 3, a configuration manner of the frequency domain region in the time-frequency resource region includes at least one of the following:

Manner one: configuring as an overlapping area or its subset of a bandwidth part (BWP) of a plurality of UEs in a group where the UE is located (grouping UEs having the same radio network temporary identity (RNTI) as a group of UEs). That is, when BWPs of all the UEs in the group of UEs are completely the same, the frequency domain region configured at this time is the BWP or a subset thereof; and when the BWPs of all the UEs in the group of UEs are not completely the same, the frequency domain region configured at this time is an overlapped part of the BWP of the plurality of UEs or a subset of the part, where the BWP of the UE configures part of bandwidth transmission to the UE in system bandwidth, and it can be the BWP or a plurality of BWPs. In addition, a frequency domain position of a control resource set (Coreset) where control channel carrying puncturing information is located is in the overlapping area or its subset of the BWP of the plurality of UEs.

Manner two: configuring as a minimum corpus of the BWPs including a plurality of UEs in the group where the UE is located or a set including the minimum corpus. That is, when the BWPs of all the UEs in the group of UEs are completely the same, the frequency domain region configured at this time is the BWP or a set including the same; when the BWPs of all the UEs in the group of UEs are not completely the same, the frequency domain region configured at this time is the minimum corpus of the BWPs including one or more UEs or a set including the minimum corpus, where the BWP of the UE configures part of bandwidth transmission to the UE in system bandwidth, and it can be the BWP or a plurality of BWPs, where the BWP of the UE is configured to transmit bandwidth to part of the UE in a system bandwidth, and can be the BWP or a plurality of BWPs.

Manner three: configuring as at least partially including the frequency domain resource corresponding to the BWP including a plurality of UEs in the group where the UE is, and at this time at least part of overlapped RB is between the frequency domain region and the BWPs of a plurality of UEs, where the BWPs of the UEs configures part of bandwidth transmission to the UE in system bandwidth, and it can be the BWP or a plurality of BWPs.

With a resource configuration method of the frequency domain region in Instance four of the present disclosure, it can be implemented that the frequency domain region of the configured punctured area can match with BWP of a group of UEs, thereby avoiding useless large-range frequency domain indication and improving system efficiency.

Embodiment 4

An embodiment of the present disclosure further provides a storage medium, including a storage program, where the program performs the method of any one of above items when running.

In the present embodiment, the above storage medium can be configured to store program codes for performing the step S1.

In step S1, indicating, in a configured time-frequency resource region, a time-frequency resource of a service with first transmission duration pre-empted by a service with second transmission duration by physical layer signaling, where the first transmission duration is greater than the second transmission duration.

In an embodiment, the indicating, in a configured time-frequency resource region, a time-frequency resource of a service with first transmission duration pre-empted by a service with second transmission duration by the physical layer signaling includes at least one of the following:

indicating the time domain granularity of the service with the first transmission duration pre-empted by the service with the second transmission duration by the physical layer signaling; and indicating the frequency domain granularity of the service with the first transmission duration pre-empted by the service with the second transmission duration by the physical layer signaling, where a determining manner of a time domain granularity and a frequency domain granularity includes at least one of the following: both the time domain granularity and the frequency domain granularity are indicated by the physical layer signaling or configured by high-layer signaling; the time domain granularity is determined by indication of the physical layer signaling or configuration of the high-layer signaling, and the frequency domain granularity is determined according to the determined time domain granularity; or the frequency domain granularity is determined by indication of the physical layer signaling or configuration of the high-layer signaling, and the time domain granularity is determined according to the determined frequency domain granularity.

In the present embodiment, the foregoing storage medium can include, but it is not limited to: any medium that can store program code, such as a USB flash drive, a read-only memory (ROM), a random access memory (RAM), a removable hard disk, a magnetic disk, or an optical disc.

Please refer to the preceding embodiments and an example described in the embodiment for an example for the present embodiment, and it will not be described herein.

Obviously, those skilled in the art should understand that each module or each step of the above disclosure can be implemented by a universal computing apparatus, and can focus on a single computing apparatus, or distribute on a web site consisting of a plurality of computing apparatus; in an embodiment, they can be implemented by an executable program code of the computing apparatus, such that they can be stored in a storage apparatus; and in some cases, the shown or descripted steps can be performed in an order different from the one herein, or they can be respectively fabricated into one or more integrated circuit modules, or performed by fabricating a plurality of modules or steps into a single integrated circuit module. As such, the present disclosure is not limited to any specific combination of hardware and software.

What is claimed is:

1. A method for wireless communication, comprising:
performing, by a base station, a transmission to a user equipment on a physical downlink shared channel (PDSCH), wherein the transmission is configured with a resource region comprising a set of symbols in time domain and a set of physical resource blocks (PRBs) in frequency domain; and
transmitting, by the base station via a physical layer signaling, a pre-emption indication to the user equipment indicating that part of the resource region of the transmission is to be pre-empted by another transmission,
wherein the pre-emption indication includes a bitmap corresponding to a combination of a time-domain granularity and a frequency-domain granularity of the resource region, wherein the bitmap has a fixed number of bits irrespective of the time-domain granularity and the frequency-domain granularity, wherein the time-domain granularity allows a first type of time-domain granularity in which a symbol group comprises a first number of symbols and a second type of time-domain granularity in which a symbol group comprises a second, different number of symbols to coexist, and wherein the frequency-domain granularity allows a first type of frequency-domain granularity that includes a first number of PRBs and a second type of frequency-domain granularity that includes a second, different number of PRBs to coexist.

2. The method of claim 1, wherein the bitmap has 14 bits.

3. The method of claim 1, wherein 1 bit of the bitmap is used to indicate whether 50% of the set of PRBs is pre-empted.

4. The method of claim 1, wherein the first type of time-domain granularity or the second type of time-domain granularity comprises two or four orthogonal frequency division multiplexing symbols.

5. The method of claim 1, wherein the part of the resource region that is to be pre-empted is organized according to the combination of the time-domain granularity and the frequency-domain granularity.

6. A method for wireless communication, comprising:
receiving, by a user equipment, a transmission from a base station on a physical downlink shared channel (PDSCH), wherein the transmission is configured with a resource region comprising a set of symbols in time domain and a set of physical resource blocks (PRBs) in frequency domain; and
receiving, by the user equipment via a physical layer signaling, a pre-emption indication from the base station indicating that part of the resource region of the transmission is to be pre-empted by another transmission,
wherein the pre-emption indication includes a bitmap corresponding to a combination of a time-domain granularity and a frequency-domain granularity of the resource region, wherein the bitmap has a fixed number of bits irrespective of the time-domain granularity and the frequency-domain granularity, wherein the time-domain granularity allows a first type of time-domain granularity in which a symbol group comprises a first number of symbols and a second type of time-domain granularity in which a symbol group comprises a second, different number of symbols to coexist, and wherein the frequency-domain granularity allows a first type of frequency-domain granularity that includes a first number of PRBs and a second type of frequency-domain granularity that includes a second, different number of PRBs to coexist.

7. The method of claim 6, wherein the bitmap has 14 bits.

8. The method of claim 6, wherein 1 bit of the bitmap is used to indicate whether 50% of the set of PRBs is pre-empted.

9. The method of claim 6, wherein the first type of time-domain granularity or the second type of time-domain granularity comprises two or four orthogonal frequency division multiplexing symbols.

10. The method of claim 6, wherein the part of the resource region that is to be pre-empted is organized according to the combination of the time-domain granularity and the frequency-domain granularity.

11. A device for wireless communication comprising:
a processor;
and a memory including processor-executable instructions stored thereon, the processor-executable instructions upon execution by the processor configures the processor to:
perform a transmission to a user equipment on a physical downlink shared channel (PDSCH), wherein the transmission is configured with a resource region comprising a set of symbols in time domain and a set of physical resource blocks (PRBs) in frequency domain; and
transmit, via a physical layer signaling, a pre-emption indication to the user equipment indicating that part of the resource region of the transmission is to be pre-empted by another transmission,
wherein the pre-emption indication includes a bitmap corresponding to a combination of a time-domain granularity and a frequency-domain granularity of the resource region, wherein the bitmap has a fixed number of bits irrespective of the time-domain granularity and the frequency-domain granularity, wherein the time-domain granularity allows a first type of time-domain granularity in which a symbol group comprises a first number of symbols and a second type of time-domain granularity in which a symbol group comprises a second, different number of symbols to coexist, and wherein the frequency-domain granularity allows a first type of frequency-domain granularity that includes a first number of PRBs and a second type of frequency-domain granularity that includes a second, different number of PRBs to coexist.

12. The device of claim 11, wherein the bitmap has 14 bits.

13. The device of claim 11, wherein 1 bit of the bitmap is used to indicate whether 50% of the set of PRBs is pre-empted.

14. The device of claim 11, wherein the first type of time-domain granularity or the second type of time-domain granularity comprises two or four orthogonal frequency division multiplexing symbols.

15. The device of claim 11, wherein the part of the resource region that is to be pre-empted is organized according to the combination of the time-domain granularity and the frequency-domain granularity.

16. A device for wireless communication comprising:
a processor;
and a memory including processor-executable instructions stored thereon, the processor-executable instructions upon execution by the processor configures the processor to:
receive a transmission from a base station on a physical downlink shared channel (PDSCH), wherein the transmission is configured with a resource region comprising a set of symbols in time domain and a set of physical resource blocks (PRBs) in frequency domain; and
receive, via a physical layer signaling, a pre-emption indication from the base station indicating that part of the resource region of the transmission is to be pre-empted by another transmission,
wherein the pre-emption indication includes a bitmap corresponding to a combination of a time-domain granularity and a frequency-domain granularity of the resource region, wherein the bitmap has a fixed number of bits irrespective of the time-domain granularity and the frequency-domain granularity, wherein the time-domain granularity allows a first type of time-domain granularity in which a symbol group comprises a first number of symbols and a second type of time-domain granularity in which a symbol group comprises a second, different number of symbols to coexist, and wherein the frequency-domain granularity allows a first type of frequency-domain granularity that includes a first number of PRBs and a second type of frequency-domain granularity that includes a second, different number of PRBs to coexist.

17. The device of claim 16, wherein the bitmap has 14 bits.

18. The device of claim 16, wherein 1 bit of the bitmap is used to indicate whether 50% of the set of PRBs is pre-empted.

19. The device of claim 16, wherein the first type of time-domain granularity or the second type of time-domain granularity comprises two or four orthogonal frequency division multiplexing symbols.

20. The device of claim 16, wherein the part of the resource region that is to be pre-empted is organized according to the combination of the time-domain granularity and the frequency-domain granularity.

\* \* \* \* \*